(12) United States Patent
Agner et al.

(10) Patent No.: US 11,312,226 B2
(45) Date of Patent: Apr. 26, 2022

(54) CLUTCH DEVICE FOR A MOTOR VEHICLE DRIVE TRAIN; TRANSMISSION UNIT AND DRIVE TRAIN

(71) Applicant: Schaeffler Technologies AG & Co. KG, Herzogenaurach (DE)

(72) Inventors: Ivo Agner, Bühl (DE); Aurelie Keller, Herrlisheim (FR); Thomas Hurle, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/734,006

(22) PCT Filed: May 22, 2019

(86) PCT No.: PCT/DE2019/100455
§ 371 (c)(1),
(2) Date: Dec. 1, 2020

(87) PCT Pub. No.: WO2019/233519
PCT Pub. Date: Dec. 12, 2019

(65) Prior Publication Data
US 2021/0213824 A1  Jul. 15, 2021

(30) Foreign Application Priority Data

Jun. 4, 2018  (DE) .................. 102018113221.2
Apr. 10, 2019  (DE) .................. 10 2019 109 424.0

(51) Int. Cl.
*F16D 25/10* (2006.01)
*B60K 6/387* (2007.10)
(Continued)

(52) U.S. Cl.
CPC .............. *B60K 6/387* (2013.01); *F16D 25/10* (2013.01); *B60K 6/405* (2013.01); *B60K 23/02* (2013.01);
(Continued)

(58) Field of Classification Search
CPC .. F16D 2023/126; F16D 23/142; F16D 25/10; F16D 21/04
See application file for complete search history.

(56) References Cited

U.S. PATENT DOCUMENTS

2017/0122413 A1*  5/2017  Tsao ................... F16D 25/0638
2017/0122434 A1   5/2017  Imafuku
(Continued)

FOREIGN PATENT DOCUMENTS

CN         1618648 A     5/2005
CN       101315107 A    12/2008
(Continued)

*Primary Examiner* — Stacey A Fluhart
(74) *Attorney, Agent, or Firm* — Kevin Parks

(57) ABSTRACT

A clutch device for a motor vehicle drive train includes an input shaft, a first clutch arranged on the input shaft, a housing wall, a support bearing on the housing wall, an actuating force introduction mechanism, and a first actuating unit. The first clutch has a first clutch component with a carrier and a second clutch component. The first clutch component is directly connected to and axially supported on the input shaft. The actuating force introduction mechanism is rotationally fixed to the first clutch component such that an actuating force which adjusts the first clutch from its open position into its closed position is introduced directly into the input shaft via the carrier and is supported by the input shaft via the support bearing. The first actuating unit is operatively connected to the first clutch and includes a movable actuating bearing arranged to interact with the actuating force introduction mechanism.

8 Claims, 11 Drawing Sheets

(51) Int. Cl.
  *B60K 6/405*    (2007.10)
  *B60K 23/02*   (2006.01)
  *B60K 6/48*    (2007.10)
  *B60K 23/08*   (2006.01)
  *F16D 21/06*   (2006.01)

(52) U.S. Cl.
  CPC ............... *B60K 2006/4808* (2013.01); *B60K 2006/4825* (2013.01); *B60K 2023/0833* (2013.01); *B60Y 2200/92* (2013.01); *F16D 21/06* (2013.01)

(56) References Cited

U.S. PATENT DOCUMENTS

2018/0022200 A1    1/2018  Trent
2019/0211889 A1*   7/2019  Reimnitz .............. B60K 6/387

FOREIGN PATENT DOCUMENTS

| | | | |
|---|---|---|---|
| CN | 102099594 A | 6/2011 | |
| CN | 207128607 U | 3/2018 | |
| DE | 10338558 A1 | 3/2004 | |
| DE | 102004009832 A1 | 9/2004 | |
| DE | 102011077590 A1 | 12/2012 | |
| DE | 102012211487 A1 | 1/2014 | |
| DE | 102014014669 A1 | 4/2016 | |
| DE | 102016201214 A1 * | 8/2017 | ............ F16D 21/06 |
| EP | 1541401 A1 | 6/2005 | |
| EP | 3252332 A1 | 12/2017 | |
| WO | WO-2017088869 A1 * | 6/2017 | ............ B60K 6/387 |
| WO | WO2018077332 A1 | 5/2018 | |

* cited by examiner

CLUTCH DEVICE FOR A MOTOR VEHICLE DRIVE TRAIN; TRANSMISSION UNIT AND DRIVE TRAIN

CROSS-REFERENCE TO RELATED APPLICATIONS

This application is the United States National Phase of PCT Appln. No. PCT/DE2019/100455 filed May 22, 2019, which claims priority to German Application Nos. DE102018113221.2 filed Jun. 4, 2018 and DE102019109424.0 filed Apr. 10, 2019, the entire disclosures of which are incorporated by reference herein.

TECHNICAL FIELD

The disclosure relates to a clutch device for a motor vehicle drive train, e.g., a hybrid drive train of a motor vehicle, such as a car, truck, bus or other commercial vehicle. The disclosure also relates to a transmission unit with a transmission and with this clutch device. The disclosure also relates to a drive train equipped with this transmission unit.

BACKGROUND

Automatic transmissions for motor vehicles are generally known from the prior art. So-called P3-E machines are also already known, which are arranged at a transmission output of the automatic transmission and can be coupled and uncoupled by means of a separating clutch.

However, it has been found that, under certain operating conditions, relatively high axial forces act on the individual components of the drive train unit, which are caused, for example, by actuation of the separating clutch. The known systems are also often relatively large.

SUMMARY

The present disclosure provides a drive train unit that saves space and has a more robust structure such that axial forces occurring during operation are evenly supported.

A clutch device for a motor vehicle drive train is disclosed. The clutch device has an input shaft provided for attaching to an output of a transmission in a rotationally fixed manner and a clutch arranged on the input shaft. A first clutch component of the clutch is directly connected to the input shaft in a rotationally fixed manner and is axially supported on the input shaft, and a second clutch component of the clutch is designed for coupling to another component in a rotationally fixed manner. The clutch device is also equipped with an actuating unit that is operatively connected to the clutch. The actuating unit has an actuating bearing that moves, which actuating bearing interacts with an actuating force introduction mechanism connected in a rotationally fixed manner to the first clutch component in such a way that an actuating force which moves the clutch from its open position to its closed position is introduced directly into the input shaft via a (first) carrier of the first clutch component and is supported by the input shaft via a support bearing on a housing wall.

This design of the clutch device makes it possible to support axial forces that arise during operation directly on the input shaft and not to allow them to pass over to the second clutch component. The mounting of the second clutch component or the dimensioning of the second clutch component can thus be chosen to be more compact. In addition, pre-assembly of a unit from the clutch and the actuating unit to form a uniform module is simplified.

In an example embodiment, there are two clutches, and an actuating unit interacting with each of them. As a result, two clutches are actuated in a space-saving manner. A first clutch may be used to act as a separating clutch between the input shaft and an electric machine, i.e. a rotor of the electric machine. In this way, the axial forces acting on the rotor can be reduced or avoided. The second clutch component of the first clutch may be coupled to a rotor of the electric machine via a gear stage or an endless traction drive. The second clutch component may have a toothing which is in meshing engagement with a gear connected to the rotor in a rotationally fixed manner. As a result, the bearings of the gear and the rotor can be dimensioned small.

A second clutch may be used to act between the input shaft and an output shaft prepared for a rotationally fixed connection to a Cardan shaft. The second clutch component of the second clutch may be directly/indirectly connected to the output shaft in a rotationally fixed manner. As a result, the clutch is used as a coupling element for switching over to an all-wheel drive of the motor vehicle.

The actuating units may be each arranged on sides of the housing wall that are axially remote from one another. As a result, they are compact in the axial direction. The at least one actuating unit may be designed and arranged in such a way that the actuating force is supported via the actuating bearing, an adjustment element such as a lever element or a pressure pot, an (optional) actuator, a counter support area, the carrier, the input shaft, the support bearing and the housing wall. As a result, no actuating force is passed on the second clutch component to a used gear stage, for example, on the part of the electric machine or a Cardan shaft. The at least one actuating unit may have an axial force actuator designed as a lever actuator. The structure of the lever actuator is compact if it has at least one electric motor for driving a lever mechanism.

The disclosure further relates to a transmission unit for a hybrid vehicle, with the clutch device according to one of the embodiments described above, and with a transmission connected to the input shaft of the clutch device.

The disclosure also relates to a drive train for a hybrid vehicle, with the transmission unit and a differential gear coupled in a non-rotationally fixed manner to an output shaft of the clutch device. This makes a powerful drive train available. The output shaft of the drive train unit may be connected to a Cardan shaft leading to a differential gear in a non-rotationally fixed manner. As a result, the drive train unit is integrated directly into an all-wheel drive of the hybrid vehicle.

In other words, according to the disclosure, a hybrid transmission (transmission unit) is made available which has an (automatic) transmission and an electric machine which is axially offset therefrom and is arranged at an output of the transmission. The electric machine can be coupled to/decoupled from a drive train using a separating clutch. In addition, a further (second) clutch can optionally be provided, which is designed for coupling/decoupling a drive shaft (output shaft) connected to a differential gear. The electric machine and the at least one clutch or the two clutches together form a module. The clutch or clutches are operated via levers (lever actuators). An actuating force is fed into a shaft (input shaft) via an inner plate carrier and is supported on a support bearing in a wall (housing wall) of a housing.

BRIEF DESCRIPTION OF THE DRAWINGS

The disclosure will now be explained in more detail with reference to figures, in which context various exemplary embodiments are also shown. In the figures.

DETAILED DESCRIPTION

The figures are only schematic in nature and serve only for understanding the disclosure. The same elements are provided with the same reference signs. The different features of the various exemplary embodiments can also be freely combined with one another.

Figure 1:
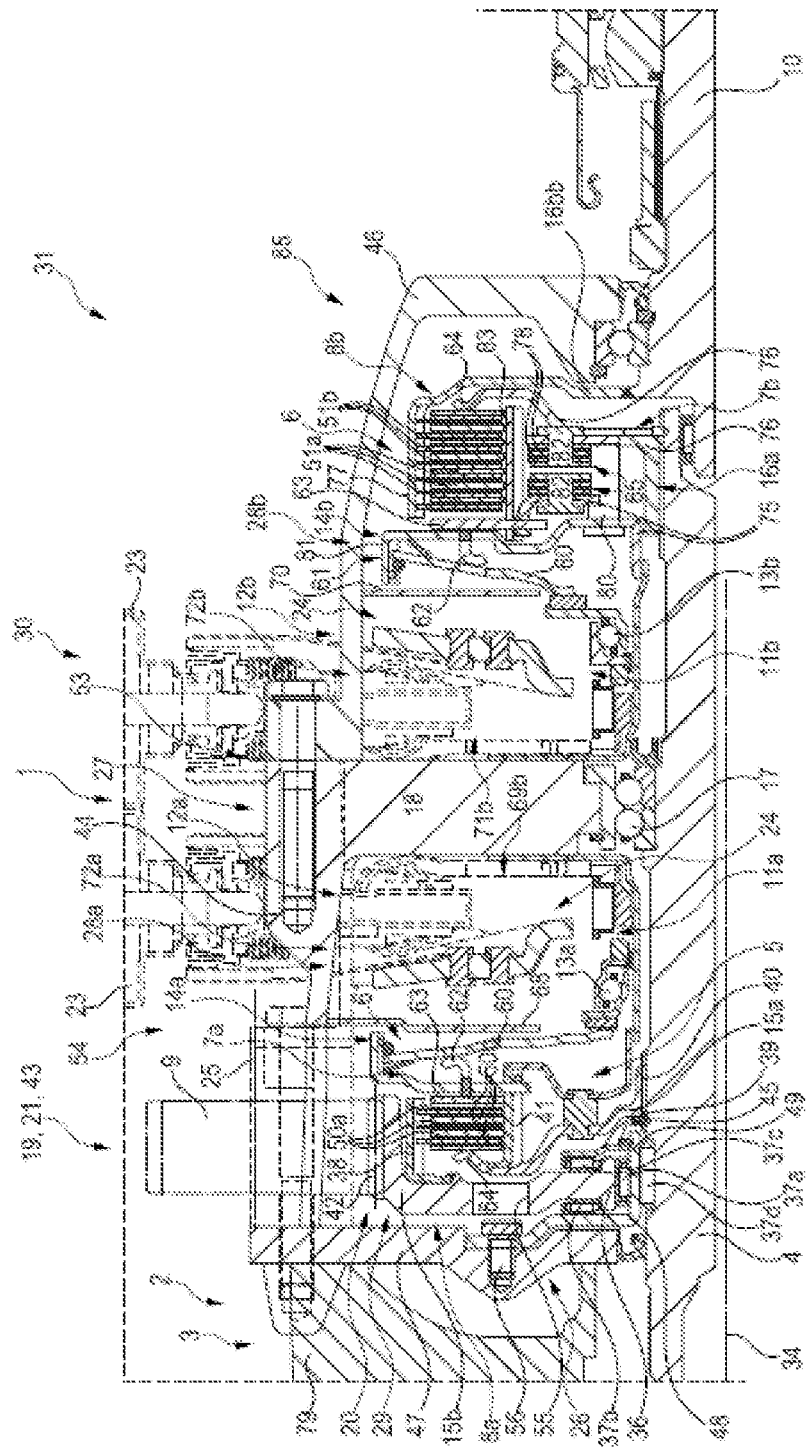
FIG. 1 shows a longitudinal sectional view of a drive train unit integrated in a transmission unit, according to a first exemplary embodiment, the drive train unit having two different clutches and, for the sake of clarity, the illustration of an electric machine is omitted.
Figure 6:
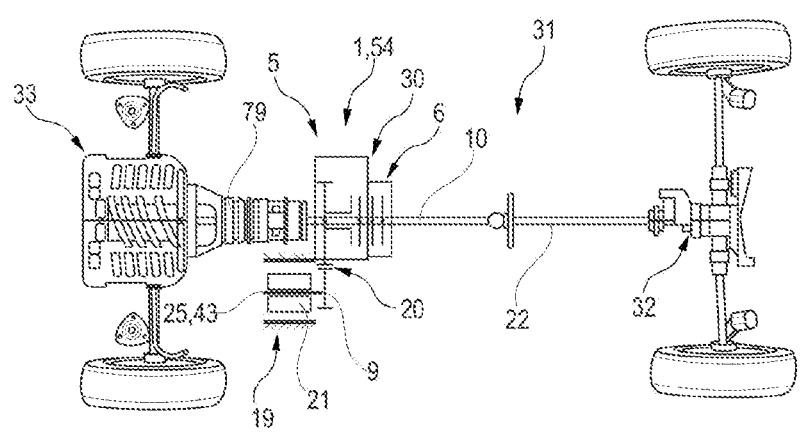
FIG. 6 shows a schematic view of a drive train used in a motor vehicle, in which the drive train unit according to FIG. 1 is used.

FIG. 1 shows a drive train unit 54 constructed according to a first exemplary embodiment. The drive train unit 54 is already operatively connected to a transmission 3, which is only indicated with regard to its position in FIG. 1 and is further illustrated in FIG. 6. The drive train unit 54 forms a transmission unit 30 with this transmission 3. The transmission 3 is implemented as an automatic transmission. An output 2 (in the form of a transmission output shaft) of the transmission 3 is connected in a rotationally fixed manner to an input shaft 4 of the drive train unit 54. The output 2 may be connected in a rotationally fixed manner to the input shaft 4 via a toothing. The transmission unit 30 may be used in a drive train 31 of a hybrid all-wheel drive vehicle, as can be seen in FIG. 6. The transmission 3 is operatively connected on the input side in a typical manner to an internal combustion engine 33. The drive train unit 54 is inserted between the transmission 3 and a Cardan shaft 22 which is further connected to a differential gear 32 on a rear axle of the motor vehicle. The Cardan shaft 22 is fixed in a rotationally fixed manner to an output shaft 10 of the drive train unit 54. The drive train unit 54 has a clutch device 1 with two clutches 5, 6 and an electric machine 19, which is indicated in principle with regard to its position.

Returning to FIG. 1, it can also be seen that the drive train unit 54 has a housing 27 which essentially forms two housing areas 28a, 28b separated from one another by a housing wall 18/partition wall. In a first housing area 28a of the housing 27, a first clutch 5, which is referred to below as a separating clutch 5, is housed radially outside the centrally arranged input shaft 4, the axis of rotation/longitudinal axis of which is has the reference sign 34. The separating clutch 5 is implemented as a friction plate clutch. The input shaft 4 is supported on a radial inside of the housing wall 18 by a support bearing 17, designed here as a double ball bearing/double-row groove ball bearing. The separating clutch 5 is rotatably coupled with its second clutch component 8a to a rotor 21 of the electric machine 19.

The second clutch component 8a has a plurality of second friction plates 50b, which are typically connected to a plurality of first friction plates 50a of a first clutch component 7a of the separating clutch 5 in a rotationally fixed manner (closed position) or are rotationally decoupled from them (open position) for the design as a friction plate clutch. The first and second friction plates 50a, 50b are arranged alternately with one another in the axial direction. The separating clutch 5 is moved back and forth between its closed position and its open position by a first actuating unit 11a. The friction plates 50a, 50b are to be understood as units having a friction lining on a support element either on one side or on both sides.

As explained in more detail below, the first actuating unit 11a is equipped with a (first) axial force actuator in the form of a first lever actuator 12a, which has an adjusting effect on a first actuating bearing 13a. The first actuating bearing 13a in turn serves to shift the first and second friction plates 50a, 50b. The first lever actuator 12a, and the second lever actuator 12b described below, are each implemented in a known manner. In this connection, reference is made by way of example to the release system of DE 10 2004 009 832 A1, the structure and function of which is considered to be integrated therein for the respective lever actuator 12a, 12b. Accordingly, the respective lever actuator 12a, 12b has an electric motor 23 which, for example, interacts with a ramp element to adjust it via a spindle drive. The ramp element is axially adjustable by means of a pivot point which can be moved along its radial ramp contour and which can be adjusted by the spindle drive. Due to the axial coupling of the ramp element to the actuating bearing 13a, 13b, the respective actuating bearing 13a, 13b is displaced and the corresponding clutch is actuated. In a further embodiment, the respective axial force actuator is alternatively implemented as a hinge actuator. In this connection, reference is made to DE 10 2012 211 487 A1, which describes such a hinge actuator, the design of which is considered to be integrated therein for the respective axial force actuator. Accordingly, in the further embodiment, the first axial force actuator is implemented as a first hinge actuator and/or the second axial force actuator is implemented as a second hinge actuator.

The second clutch component 8a also has a (second) carrier 15b which is rotatably mounted relative to the housing 27, namely to a bearing flange unit 26 connected to the housing 27 and forming the housing 27, which is referred to simply as the bearing flange 26 in the following. For this purpose, the second carrier 15b has a bearing base 36 on its radial inside, which is supported on the bearing flange 26 via a plurality of roller bearings 37a, 37b, 37c in the axial direction and in the radial direction. From this bearing base 36, the second carrier 15b extends radially outwards in a substantially disk-shaped manner with respect to the axis of rotation 34. On a radial outer side, the second carrier 15b forms a toothing 42 (external toothing) which is coupled in a rotationally fixed manner with the rotor 21, as described in more detail below.

A (first) receiving area 38 projecting in the axial direction is provided radially inside the toothing 42 on the second carrier 15b, which first receiving area 38 serves directly to receive the second friction plates 50b in a rotationally fixed manner. The receiving area 38 is also part of the second clutch component 8a. In addition, the second friction plates 50b are received on the first receiving area 38 such that they can be displaced relative to one another in the axial direction. The second friction plates 50b are arranged towards a radial inside of the first receiving area 38, so that the second carrier 15b forms an outer plate carrier of the separating clutch 5. The second carrier 15b extends in such a way that the first friction plates 50a are arranged in the radial direction outside the bearing base 36 and radially inside the toothing 42.

The first clutch component 7a is permanently coupled to the input shaft 4 in a rotationally fixed manner. For this purpose, the first clutch component 7a has a (first) carrier 15a. The first carrier 15a is connected in a rotationally fixed manner to the input shaft 4 via a serration 40. The first carrier 15a has a first sleeve region 41 which extends in the axial direction and to the radial outer side of which the first friction plates 50a are arranged in a rotationally fixed manner and displaceable relative to one another in the axial direction. The first carrier 15a thus forms an inner plate carrier of the separating clutch 5.

In this embodiment, the electric machine 19 with its rotor 21, which in turn can be rotated about a rotor axis of rotation 25, is arranged radially outside the input shaft 4. A rotor shaft 43 (FIG. 6) of the rotor 21 is arranged radially offset, here essentially parallel to the axis of rotation 34. A gear stage 20 is provided for coupling the rotor 21 to the second carrier 15b. A gear 9, shown in dashed lines in FIG. 1, is permanently in meshing engagement with the toothing 42. The gear 9 is directly connected to the rotor shaft 43 (FIG. 6) in a rotationally fixed manner and is thus arranged coaxially to the rotor 21. If the separating clutch 5 is in an open position, it is possible to let the electric machine 19/the rotor 21 stand still. In a closed position of the separating clutch 5, the electric machine 19 can typically be operated. In further embodiments, instead of the gear stage 20, a coupling of the rotor 21 via an endless traction means, such as a belt or chain, with the toothing 42 which is then correspondingly adapted to the endless traction means is provided.

With regard to the bearing flange 26, which supports the second carrier 15b, it can also be seen that it is essentially implemented in two parts, wherein a one-part design according to further embodiments is also possible. A disk-shaped base body 47 of the bearing flange 26 is further connected to a main housing component 44 of the housing 27 that forms the housing wall 18. In this embodiment, the base body 47, like the main housing component 44, is made of an aluminum material (a cast aluminum material) and itself forms a crank.

A support element 48 of the bearing flange 26 is connected to the base body 47. The support element 48 is fastened to the base body 47 (in the area of its crank) via a plurality of fasteners 56, here screws, which are distributed in the circumferential direction. For easier attachment of the fasteners 56, axial through holes 55 are made in the second carrier 15b at the radial height of the fasteners 56. Each of these through holes 55 is axially aligned with fasteners 56 in an initial position/assembly position. The support element 48 may be made from a formed steel material. The support element 48 has a bearing area 49 which forms a crank.

The bearing area 49 constitutes an axial projection on which the second carrier 15b is supported radially from the outside. The second carrier 15b is mounted on the bearing area 49 via a first roller bearing 37a serving as a radial bearing. On a side of the second carrier 15b facing the base body 47 in the axial direction, a second roller bearing 37b is arranged between the support element 48 and the second carrier 15b, forming an axial bearing. A third roller bearing 37c, which also forms an axial bearing, is arranged on a side of the second carrier 15b axially facing away from the base body 47. This third roller bearing 37c is arranged in the axial direction between the second carrier 15b and a shim 39 in the form of a shim disk, which is received on the support element 48 in an axially fixed manner. The shim 39 is fixed directly to the bearing area 49 by means of a retaining ring 45. The input shaft 4 is supported radially from the inside on the bearing area 49 via a fourth roller bearing 37d relative to the housing 27. With regard to the first to fourth roller bearings 37a to 37d, it should be pointed out that, although these are implemented as needle bearings in this embodiment, they can also be implemented in other ways, for example as ball bearings.

The housing wall 18 divides the housing 27 into the first housing area 28a and the second housing area 28b. The second housing area 28b is delimited by a secondary housing component 46 which forms a bell and which is fastened to the main housing component 44. A further, second clutch 6 is arranged in the second housing region 28b. The second clutch 6 is also implemented as a friction clutch, namely a friction plate clutch. For example, as explained in more detail below, this second clutch 6 is implemented as a self-intensifying clutch 6. A first clutch component 7b of the second clutch 6 is connected to the input shaft 4 in a rotationally fixed manner. A second clutch component 8b of the second clutch 6 is connected in a non-rotationally fixed manner to the output shaft 10, which output shaft 10, as already described, is further connected to the Cardan shaft 22.

The first clutch component 7b of the second clutch 6 has a first carrier 16a (of the second clutch 6) as well as a plurality of first friction plates 51a (of the second clutch 6), which are axially displaceable relative to one another and mounted on the first carrier 16a in a non-rotationally fixed manner. The first friction plates 51a alternate with second friction plates 51b of the second clutch component 8b of the second clutch 6 in the axial direction. The second friction plates 51b are in turn mounted on a second carrier 16b (of the second clutch 6) in a rotationally fixed manner and axially displaceable relative to one another. The second carrier 16b is directly connected to the output shaft 10 (here via a weld). To adjust the second clutch 6 between its open position and its closed position, a second actuating unit 11b is provided in the second housing area 28b.

The second actuating unit 11b is, as explained in more detail below, equipped with a (second) axial force actuator in the form of a second lever actuator 12b, which has an adjusting effect on a second actuating bearing 13b. The second actuating bearing 13b in turn serves to move the first and second friction plates 51a, 51b.

Figure 17:
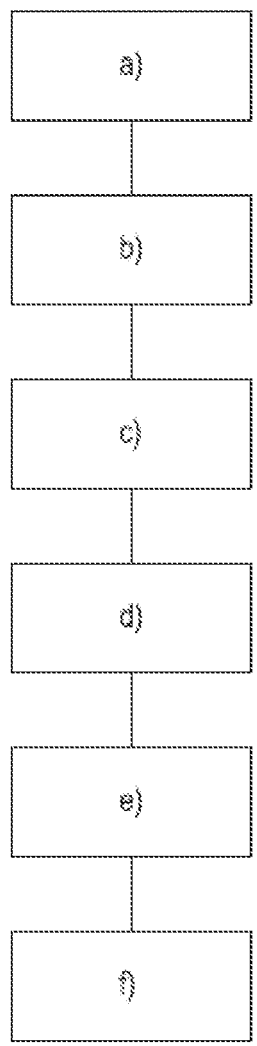
FIG. 17 shows a schematic view to illustrate an assembly method of the drive train unit according to FIG. 1.

In connection with FIGS. 1 and 17, reference should also be made to a method of assembling the drive train unit 54 or the transmission unit 30. In a first step a), the bearing flange 26 is attached to the transmission housing, namely screwed to this transmission housing 79. In this first step a), the electric machine 19 is also attached to the transmission housing.

In a second step b) a first module 29 is provided. The bearing flange 26 together with the second carrier 15b of the separating clutch 5 mounted thereon forms the common first module 29. The second carrier 15b is mounted together with the first to third roller bearings 37a, 37b, 37c on the support element 48 fastened to the base body 47. In addition, in the second step b), the rotor 21 of the electric machine 19 is connected to the second carrier 15b of the separating clutch 5 via the gear stage 20. The gear stage 20, i.e. the gear 9 including its mounting and the electric machine 19 are already pre-assembled in step a). In addition, the axial play of the second carrier 15b of the separating clutch 5 is adjusted by means of the shim 39. In a further embodiment, the first module 29 is first installed separately (according to step b)) and then attached (according to step a)) to the transmission housing 79 by fastening the bearing flange 26.

In a third step c) the central input shaft 4 is supported via the support bearing 17 on the radially inwardly projecting housing wall 18. The support bearing 17 is consequently preloaded between the main housing component 44 and the input shaft 4. The support bearing 17 is thus firmly fixed between the housing 27 and the input shaft 4. In this third step c), the main housing component 44 is still spaced apart/disassembled from the bearing flange 26 and the other components of the housing 27. The input shaft 4 is also arranged separately from the separating clutch 5.

In a fourth step d), a first lever actuator 12a (first axial force actuator) of the first actuating unit 11a provided for actuating the separating clutch 5 is mounted in the main housing component 44, namely in the first housing area 28a. In this fourth step d), a second lever actuator 12b (second axial force actuator) provided for actuating the second clutch 6 is also mounted in the main housing component 44, namely in the second housing area 28b. This results in an assembly in which the second lever actuator 12b is mounted on an axial side of the housing wall 18 facing away from the first lever actuator 12a.

In a fifth step e), the first clutch component 7a of the separating clutch 5 is attached to the input shaft 4 in a rotationally fixed manner. A second module 53 is thus created. Furthermore, the first clutch component 7b of the second clutch 6 is connected in a rotationally fixed manner to the input shaft 4. To implement a third module 85, the secondary housing component 46 connected to part of the second clutch component 8b of the second clutch 6 is also provided. The third module 85 is fastened to the main housing component 44, wherein the second clutch 6 with its two clutch components 7b, 8b that can be coupled to one another fully assembled and the second lever actuator 12b is brought into operative connection with this second clutch 6. With the second clutch component 8b of the second clutch 6, the output shaft 10 is already connected in a rotationally fixed manner in this step.

In a sixth step f), a second module 53 provided by steps c) to e) is finally connected as a whole to the first module 29 so that the main housing component 44 is connected to the bearing flange 26, the separating clutch 5 with its two clutch components 7a, 8a that can be coupled to one another, is fully assembled and the first lever actuator 12a is brought into operative connection with the separating clutch 5. Finally, the drive train unit 54 is mounted on the transmission housing 79. The individual method steps a) to f) may be carried out one after the other in alphabetical order.

After step f), the third module 85 may be attached to the second module 53. In this connection, it should be pointed out that the various modules 29, 53, 85 can be mounted independently of one another in any order. It is also possible to provide only two of the three modules 29, 53, 85 and connect them to one another.

Figure 3:
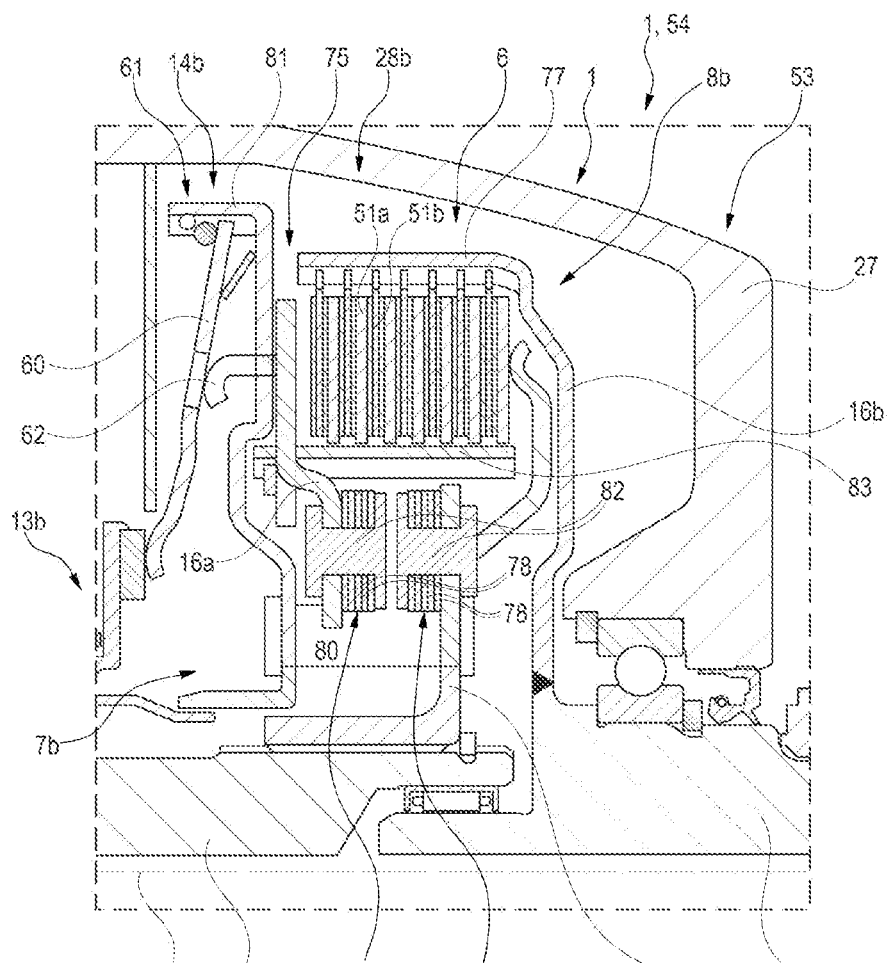
FIG. 3 shows a detailed longitudinal sectional view of the drive train unit according to FIG. 1 in the area of a self-reinforcing, further clutch provided in addition to the separating clutch.
Figure 4:
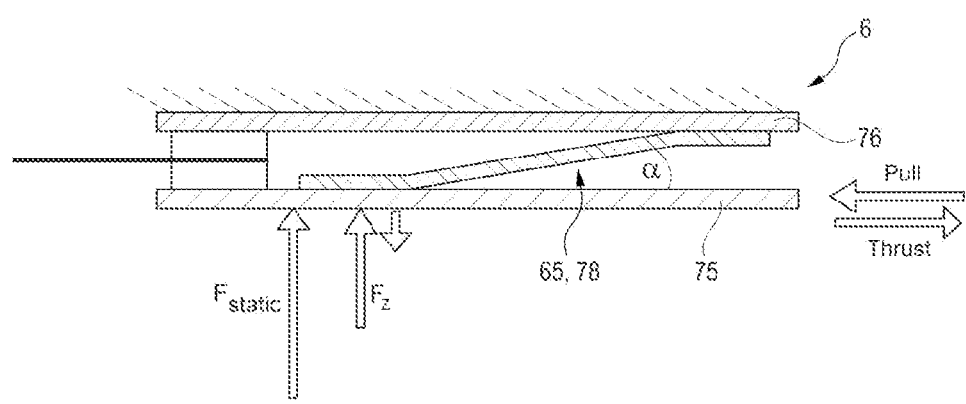
FIG. 4 shows a schematic representation of a peripheral area of the further clutch according to FIG. 3, in which area a leaf spring unit can be seen which has a certain angle of attack when the further clutch is closed.
Figure 5:
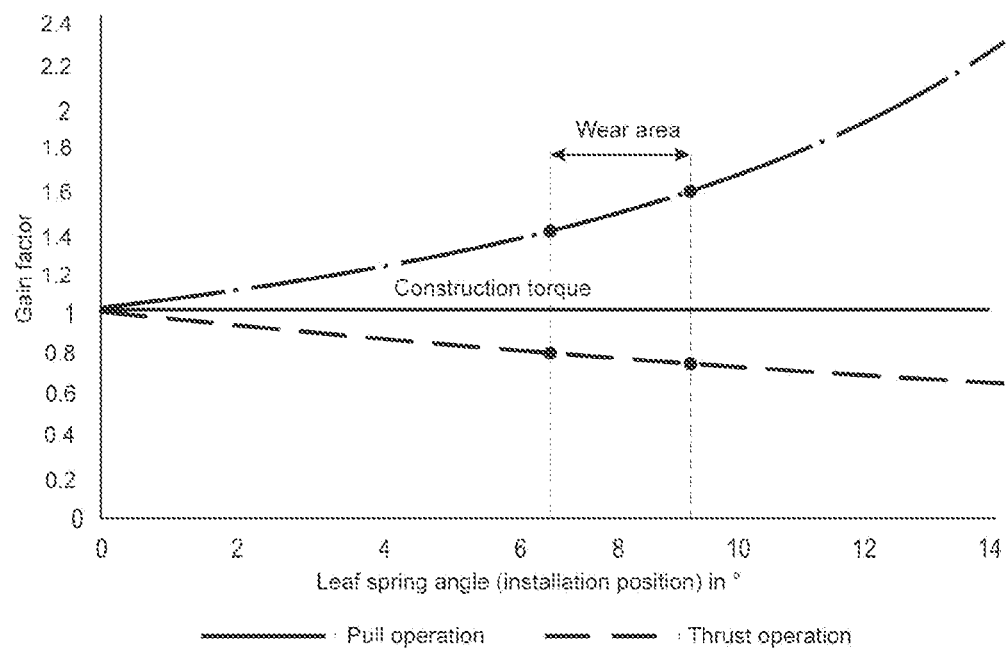
FIG. 5 shows a diagram to illustrate a relationship between a gain factor and the angle of attack of the leaf springs of the leaf spring unit (leaf spring angle) of the further clutch according to FIG. 3.
Figure 7:
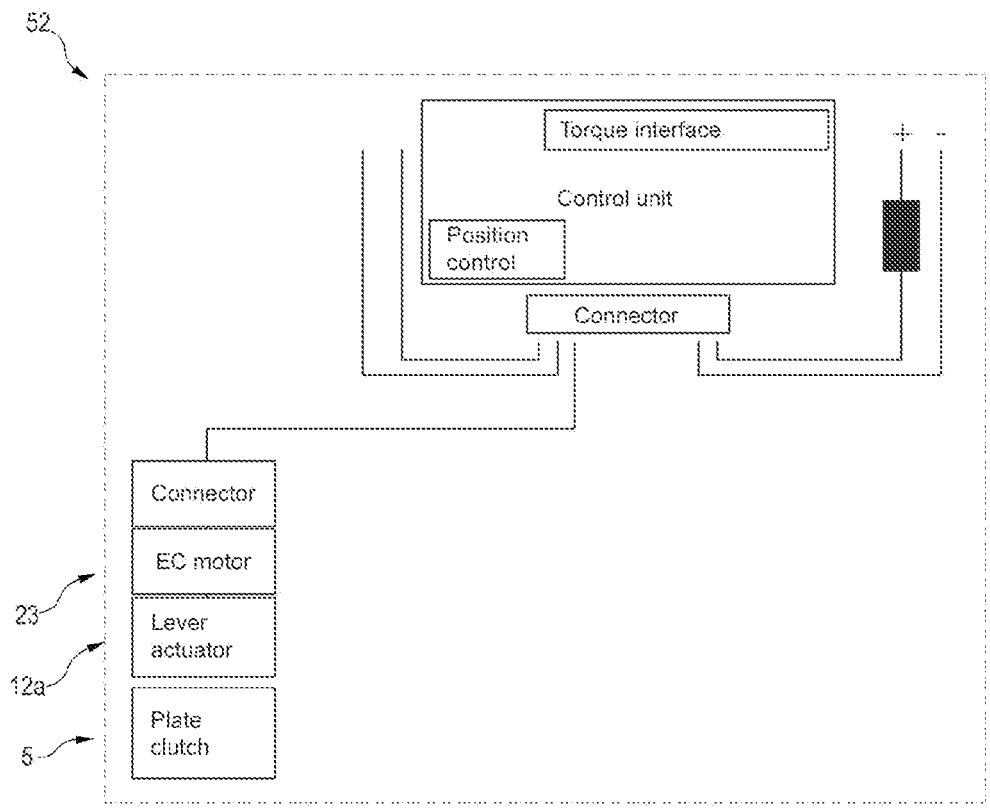
FIG. 7 shows a schematic representation of a control system that can be used to control the separating clutch.
Figure 8:
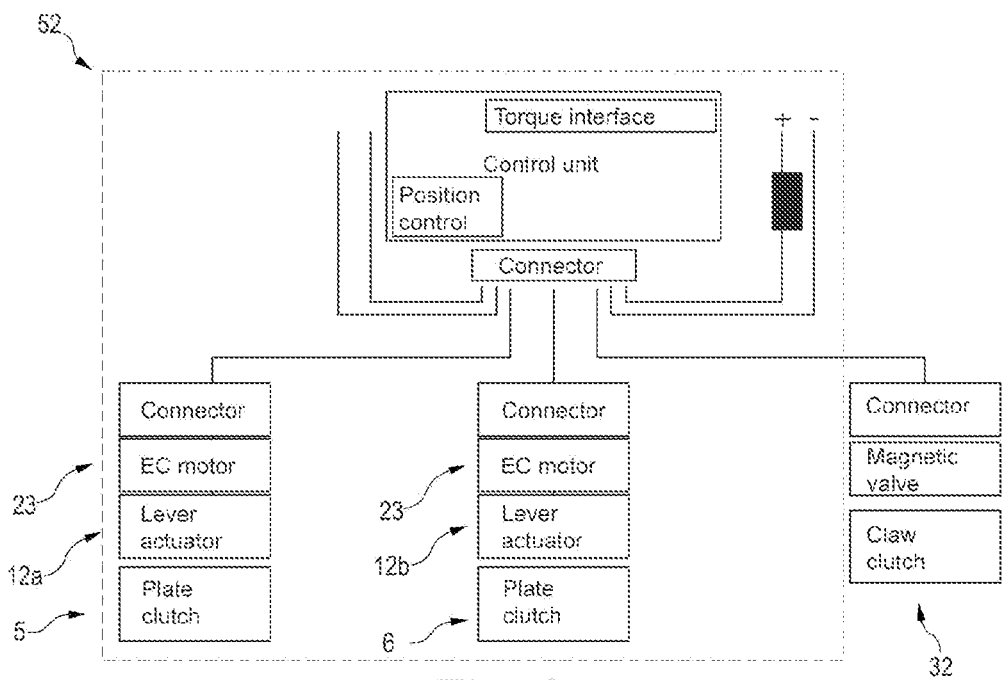
FIG. 8 shows a schematic representation of a control system that can be used to control the two clutches of the drive train unit according to FIG. 1.
Figure 9:
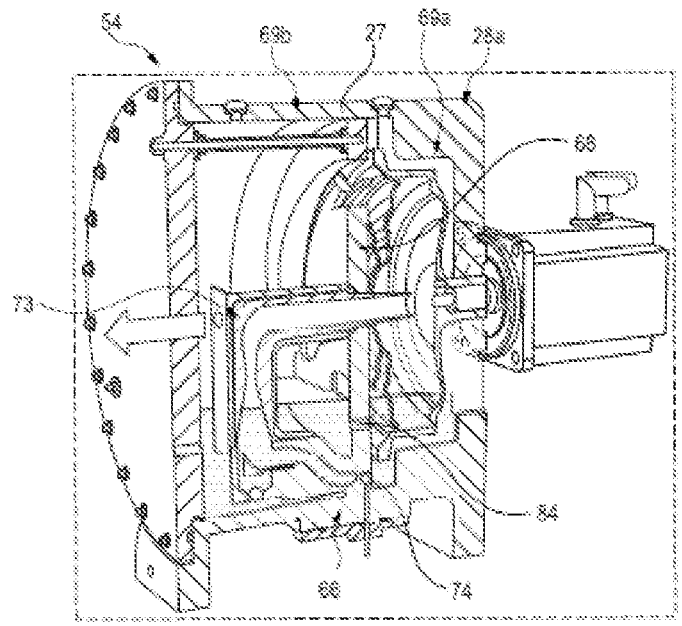
FIG. 9 shows a perspective longitudinal sectional illustration of a drive train unit according to a third exemplary embodiment in a standing state, the drive train unit being implemented while running wet and having a coolant delivery device.

FIGS. 3 to 5 further describe the self-intensifying structure of the second clutch 6, which is described in detail below. FIGS. 7 and 8 also illustrate control systems 52 which can be implemented in principle and which are designed to control the drive train unit 54. FIG. 7 shows the control system 52 only on the side of an area that interacts with the separating clutch 5. In FIG. 8, the entire control system 52 is also shown with an area, which control system controls the second clutch 6 and the differential gear 32 designed as a rear axle gear.

Figure 2:
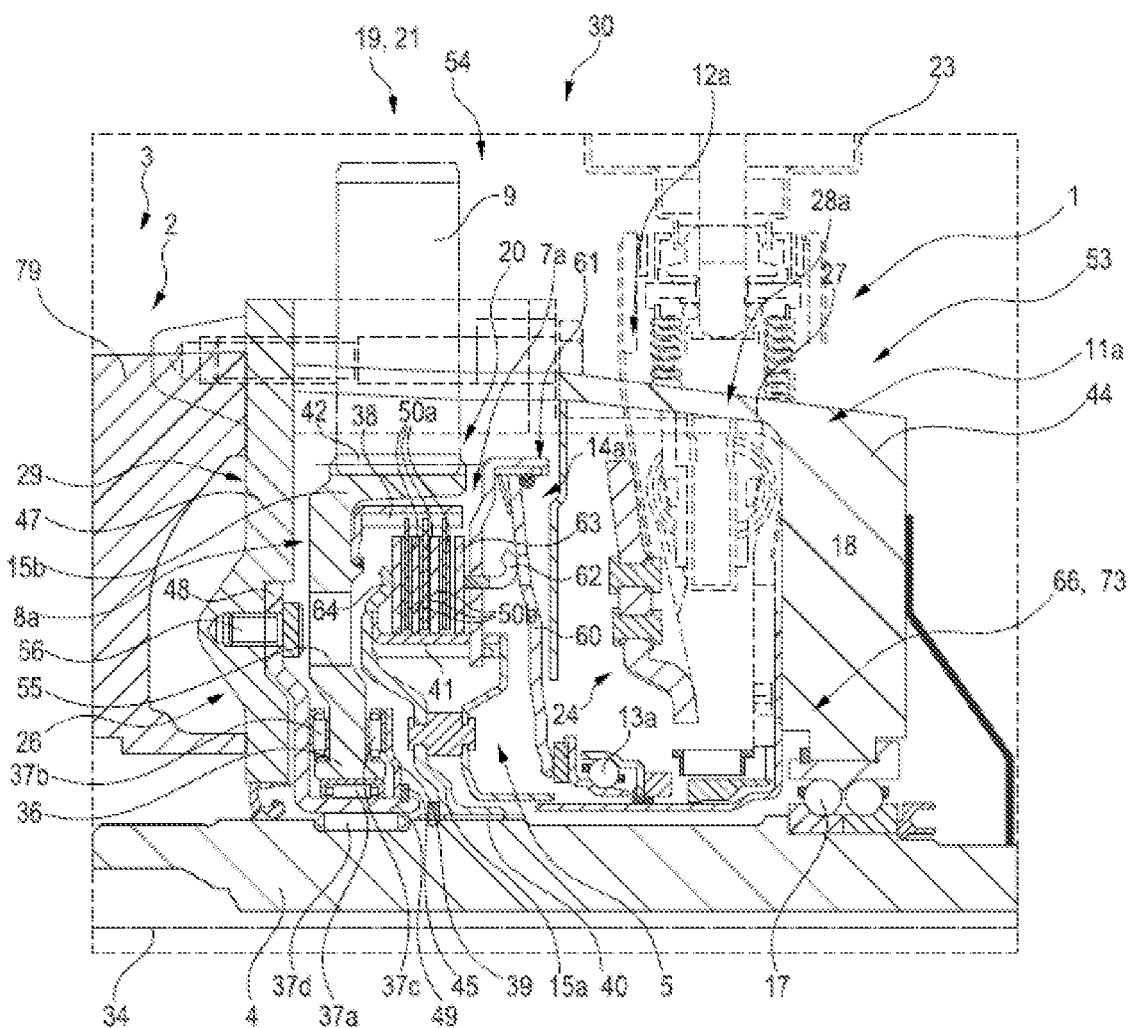
FIG. 2 shows a longitudinal sectional view of a drive train unit designed for a front-wheel drive of a motor vehicle, according to a second exemplary embodiment, wherein the drive train unit is provided with only a single separating clutch.

In connection with FIG. 2, a second exemplary embodiment of the drive train unit 54 is illustrated, wherein this corresponds in structure and function to the first exemplary embodiment. The drive train unit 54 of this second exemplary embodiment is implemented like the first exemplary embodiment with regard to the first housing area 28a and the components accommodated by this first housing area 28a. In this connection, it should be pointed out that, in principle, the further optional second clutch 6 is also dispensed with in order to provide a hybrid transmission unit 30, e.g., purely for front-wheel drive. In this embodiment, the drive train unit 54 therefore only has the function of coupling and uncoupling the electric machine 19 from the front wheels of the motor vehicle. The assembly takes place according to the method described above, wherein the partial steps relating to the second clutch 6 are omitted.

As can be seen in FIG. 1, both the first clutch 5 and the second clutch 6 of the clutch device 1 have an actuating unit 11a, 11b assigned thereto. The first actuating unit 11a acting on the first clutch 5 is accommodated together with the first clutch 5 in the first housing area 28a. The first actuating unit 11a and the first clutch 5 are arranged on a first axial side of the central housing wall 18. The second clutch 6 and the second actuating unit 11b acting on it are arranged on a second axial side of the housing wall 18 facing away from this first axial side. The two actuating units 11a, 11b are, in principle, arranged in a mirror-inverted manner to the housing wall 18, but are essentially constructed in the same way and function in the same way. The function of the two actuating units 11a, 11b is thus described below using the first actuating unit 11a as an example, wherein this function is also applicable to the second actuating unit 11b.

The first actuating unit 11a has the first lever actuator 12a, which is partially shown in FIG. 1. As already mentioned, the first lever actuator 12a is constructed according to the release system of DE 10 2004 009 832 A1. It can also be seen that the first actuating bearing 13a, which is implemented here as a ball bearing, also acts on a first actuating force introduction mechanism 14a, which is also received on the second carrier 15b of the first clutch 5 and acts in an adjusting manner on the friction plates 50a, 50b. In this way, an actuating force/axial force can be applied to the entirety of friction plates 50a, 50b in the axial direction and the first clutch 5 can be brought into its closed position.

To support the actuating force, the first actuating force introduction mechanism 14a is received directly on the first carrier 15a, which is also directly connected to the input shaft 4, in such a way that the actuating force is introduced directly into the input shaft 4 via the first carrier 15a and from there via the central support bearing 17 is passed on to the housing wall 18/is supported relative thereto.

The first actuating force introduction mechanism 14a has a lever element 60, which is identified by the reference sign 33. The lever element 60 is implemented, for example, as a plate spring. The lever element 60 is pivotably received on a pivot bearing 61 which is fixedly connected to the first carrier 15a. Radially within the pivot bearing 61, the lever element 60 acts in an adjusting manner on an actuator 62 which forms a pressure pot and which in turn acts directly in a shifting manner on the entirety of the friction plates 50a, 50b. Alternatively, the first actuating force introduction mechanism 14a can also be implemented only with the actuator 62 and consequently the first actuating bearing 13a can act directly on the actuator 62 in an adjusting manner. On a side of the set of friction plates 50a, 50b axially facing away from the actuator 62, a counter-support area 64 is arranged, which counter support area 64 is also directly connected to the first carrier 15a in order to achieve a closed force curve in the first carrier 15a and the actuating force to be introduced as completely as possible into the input shaft 4 via the first carrier 15ab.

As already mentioned, the second operating unit 11b is constructed and functioning in accordance with the first operating unit 11a. Accordingly, the second actuating unit 11b in turn serves to apply force to the entirety of the friction plates 51a, 51b of the second clutch 6 by means of a second actuating force introduction mechanism 14b. It can be seen here that, due to the self-intensifying design of the second clutch 6, a first carrier part 75 of the first carrier 16a of the second clutch 6, which accommodates the second actuating force introduction mechanism 14b, with a second carrier part 76, attached directly to the input shaft 4, via several leaf spring units 65 consisting of a plurality of leaf springs 78.

The counter support area 64 of the second clutch 6 is coupled directly to the second carrier part 76.

Another aspect of the disclosure is illustrated in FIGS. 9 to 16. FIGS. 9 to 16 illustrate two further exemplary embodiments of the drive train unit 54, which exemplary embodiments, however, are in principle constructed and function according to the first and second exemplary embodiments. For the sake of brevity, only the differences between these exemplary embodiments are explained below.

The drive train unit 54 according to FIGS. 9 to 14 is essentially constructed according to the second exemplary embodiment in FIG. 2. The drive train unit 54 of the third exemplary embodiment now additionally has a coolant delivery device 66, which is illustrated in its basic structure. The coolant delivery device 66 is shown in the fourth exemplary embodiment of FIGS. 15 and 16 just once for the two clutches 5, 6, since the coolant delivery devices 66 function identically. The function and structure of the coolant delivery devices 66 of FIGS. 15 and 16 are thus explained below on the coolant delivery device 66 of FIGS. 9 to 14.

The coolant delivery device 66 has a jet pump 73 which may be readily seen in FIGS. 9 to 14, and is arranged in part in a hydraulic fluid sump which is located in the installation position in a lower half of the housing 27. The coolant delivery device 66 is designed as a whole in such a way that it generates or supports a first coolant circuit 67a by means of the jet pump 73 when the input shaft 4 rotates in the first housing region 28a. The first housing region 28a which accommodates the separating clutch 5 and the first actuating unit 11a is acted upon by the first coolant circuit 67a during operation. A first bulkhead element 68 protrudes into the first housing area 28a in such a way that it divides it into two subspaces 69a, 69b. The first bulkhead element 68, which is implemented as a bulkhead plate, generates a flow through the hydraulic medium accommodated in a second subspace 69b accommodating the first actuating unit 11a. The first coolant circuit 67a is consequently directed to a first subspace 69a which receives the separating clutch 5.

Figure 10:
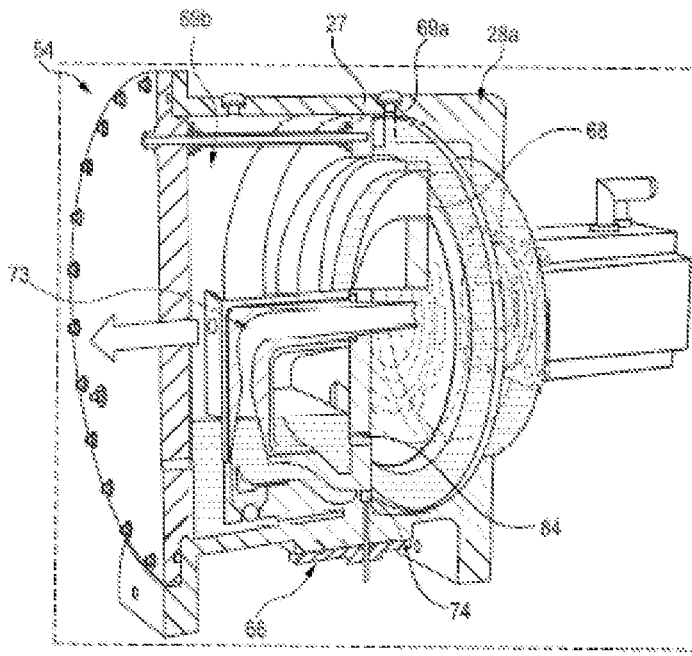
FIG. 10 shows a perspective longitudinal sectional view of the drive train unit according to FIG. 9, the input shaft now being moved at a certain speed so that a certain amount of coolant is already in the rotating area of the drive train unit.
Figure 11:
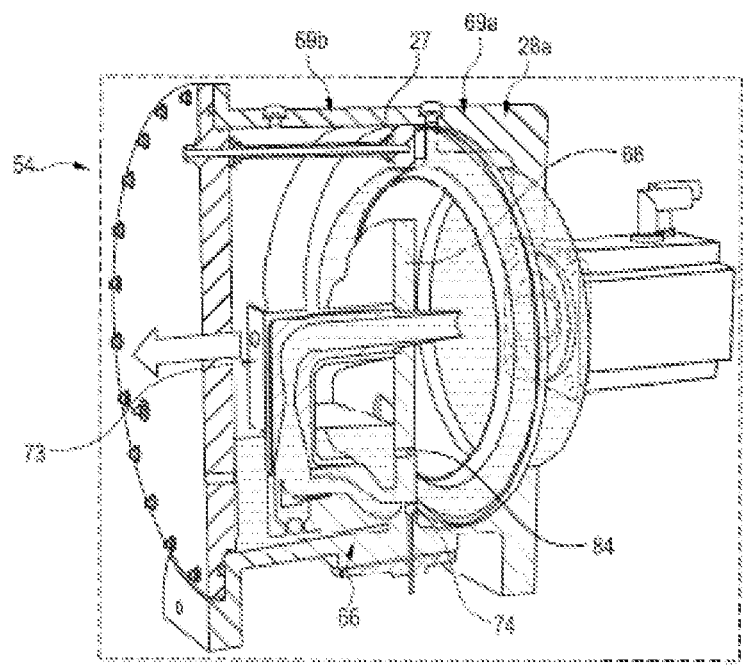
FIG. 11 shows a perspective longitudinal sectional view of the drive train unit according to FIG. 9, a plate for diverting the hydraulic medium now being slightly opened so that a higher proportion of coolant compared to FIG. 10 is built up in the rotating part of the drive train unit.
Figure 12:
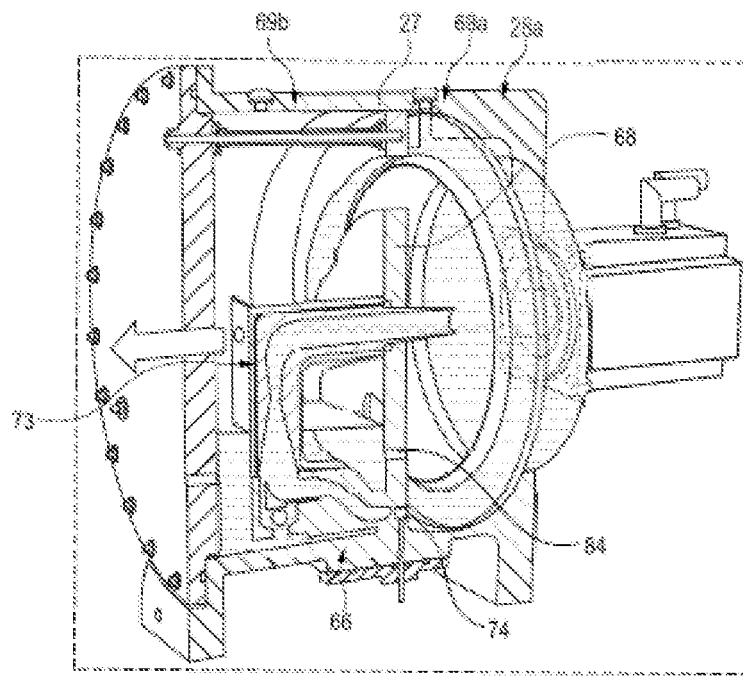
FIG. 12 shows a perspective longitudinal sectional illustration of the drive train unit according to FIG. 9 with a completely open flap, so that, compared to FIG. 11, further hydraulic medium is conveyed into the rotating part of the drive train unit.
Figure 13:
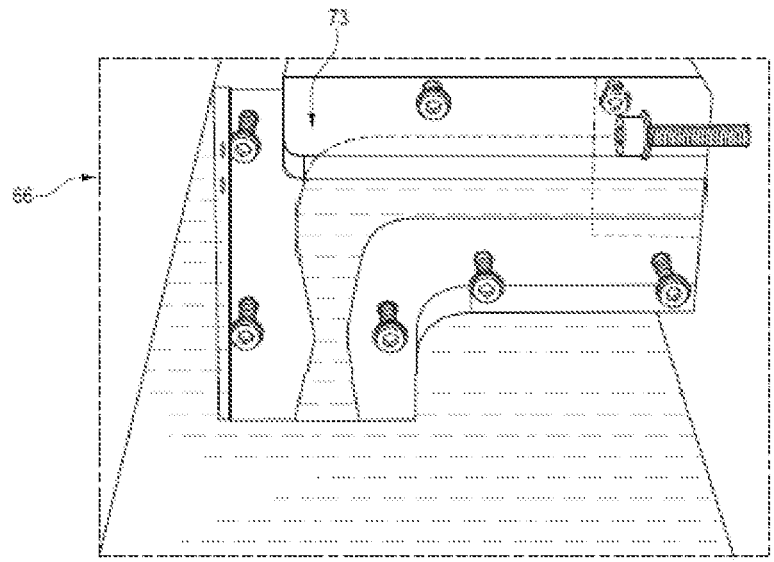
FIG. 13 is a perspective view of a longitudinal cut-away of the jet pump used in the coolant delivery device of FIGS. 9 to 12, wherein the hydraulic medium has a minimum level.
Figure 14:
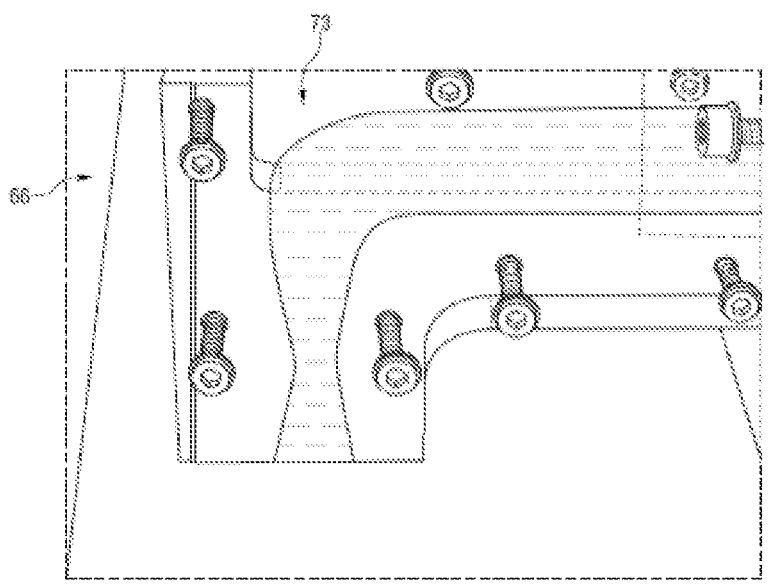
FIG. 14 shows a perspective view of a longitudinal cut-away of the area of the jet pump of FIG. 13, wherein a maximum level for conveying the hydraulic medium is now reached.

Furthermore, as shown in FIGS. 10 to 12, a valve element 74 is additionally arranged in the coolant delivery device 66, which allows a flow regulation of the coolant in the first coolant circuit 67a with the input shaft 4 rotating.

Figure 15:
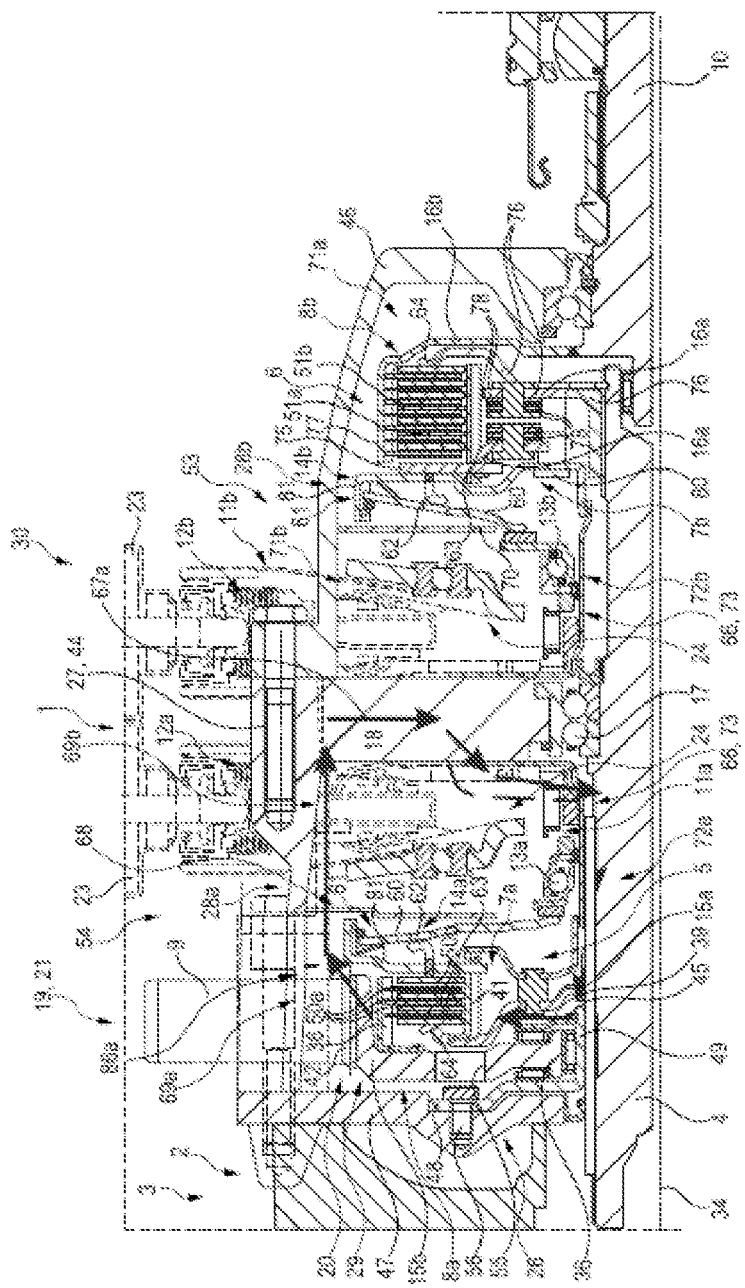
FIG. 15 shows a longitudinal cut-away illustration of a drive train unit according to a fourth exemplary embodiment, wherein a coolant delivery device is also provided and a hydraulic medium flow built up by the separating clutch is shown.
Figure 16:
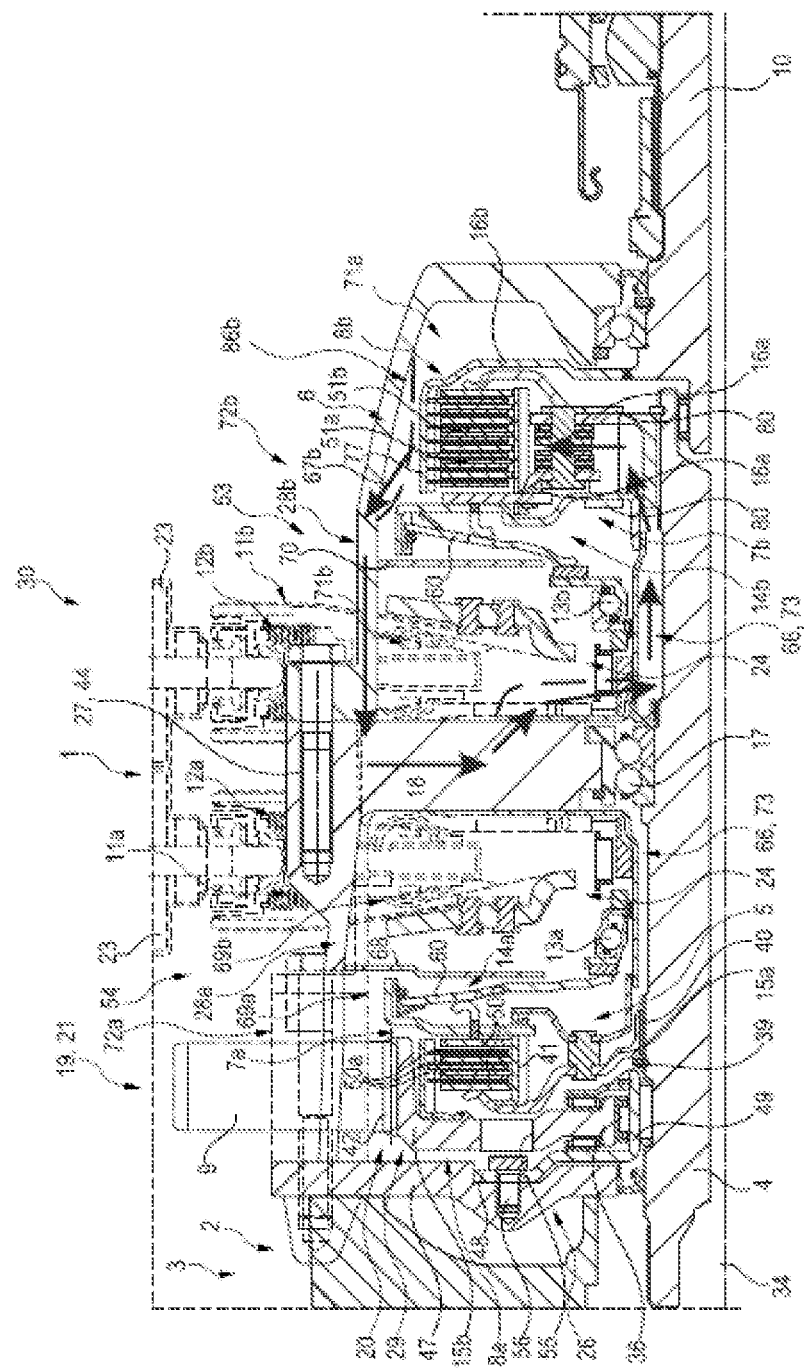
FIG. 16 shows a longitudinal cut-away illustration of the drive train unit according to FIG. 15, wherein a hydraulic medium flow built up by the further clutch during operation is now shown.

The coolant delivery devices 66 of FIGS. 15 and 16 are designed as a whole in such a way that they each generate a coolant circuit 67a, 67b both in the first housing area 28a and in the second housing area 28b with the input shaft 4 rotating and thus the clutches 5, 6 rotating. The jet pump(s) 73 is/are at least partially integrated on the housing wall 18.

As likewise shown in FIGS. 15 and 16, the respective coolant delivery device 66 has a schematically illustrated discharge element 86a, 86b. The discharge element 86a, 86b is designed in such a way that it enables the coolant flowing in the circumferential direction to be deflected into a channel in the radially inward direction. The discharge element 86a has, for example, a blade contour. The channel is implemented, for example, by a bore and initially runs axially to the housing wall 18 and from there inward in the radial direction to the input shaft 4. A first discharge element 86a is accommodated in the first subspace 69a.

The second housing area 28b is divided in the same way as the first housing area 28a. For this purpose, a second bulkhead element 70 (also designed as a bulkhead plate) is provided, which divides the second housing area 28b into two subspaces 71a, 71b. According to FIG. 16, this also enables a fluid flow from a second subspace 71b, which accommodates the second actuating unit 11b, into a first subspace 71*a*. The second coolant circuit 67*b* arises in the first subspace 71*a*, which flows around the friction plates 51*a*, 51*b* of the second clutch 6 in the radial direction and thus cools during operation. A valve element 74, which enables the flow of the coolant in the coolant circuits 67*a*, 67*b* to be regulated, is arranged for each clutch 5, 6. A second discharge element 86*b* is accommodated in the first subspace 71*a*.

As a result, a total of two independently controllable hydraulic subsystems 72*a*, 72*b*, each with a coolant delivery device 66 or, alternatively, a coolant delivery device 66 are made available, each of which makes the corresponding coolant circuit 67*a*, 67*b* controllable by the respective clutch 5, 6. This allows effective cooling of the respective clutch 5, 6.

According to a further aspect of the disclosure, as shown in FIGS. 1 and 3 and in connection with FIGS. 4 and 5, the second clutch 6 implemented as a friction clutch, which in further embodiments is also to be regarded as a unit detached from the first clutch 5 and the electric machine 19, is implemented as a self-intensifying clutch. This second clutch 6 according to the disclosure has the first clutch component 7*b* equipped with the two-part (first) carrier 16*a*. The first carrier part 75 of this first carrier 16*a* is that component which directly receives the plurality of first friction plates 51*a* in a rotationally fixed manner and axial displacement relative to one another. For this purpose, the first carrier part 75 typically has a sleeve-shaped (second) receiving area 83, on the radial outside of which the first friction plates 51*a* are attached. The first carrier part 75 also has a pressure plate 63 which is displaceable in the axial direction and which has an adjusting effect at the end on the entirety of the friction plates 51*a*, 51*b* of the second clutch 6. The pressure plate 63 is formed here by a plate element which is received separately on the second receiving area 83, but in further embodiments can in principle also be formed as one of the friction plates 51*a*, 51*b*.

The second carrier part 76 is connected to the first carrier part 75, which second carrier part 76 is that part of the first carrier 16*a* which is attached directly (by means of a serration) to the input shaft 4. The second carrier part 76 forms a counter-support region 64 on an axial side of the totality of friction plates 51*a*, 51*b* facing away from the pressure plate 63. The counter support area 64 serves to directly support an axial force/actuating force which compresses the friction plates 51*a*, 51*b* in a closed position of the second clutch 6. In the closed position, the actuating force is typically introduced via the second actuating force introduction mechanism 14*b* to the entirety of the friction plates 51*a*, 51*b* (via the pressure plate 63).

The second actuating force introduction mechanism 14*b* is fixed to the second carrier part 76. A plurality of stud bolts 80 distributed in the circumferential direction are used to fix a bearing section 81 of the second actuating force introduction mechanism 14*b* formed from a separate sheet metal to the second carrier part 76 or to design it as a component of this second carrier part 76. The lever element 60 is pivotably mounted on the mounting section 81. The lever element 60 is implemented, for example, as a plate spring. A second actuating bearing 13*b* acts on the lever element 60 and, in turn, the second lever actuator 12*b* of the second actuating unit 11*b* acts on this second actuating bearing 13*b*.

A plurality of leaf spring units 65 are provided distributed between the two carrier parts 75, 76 along a circumference of an imaginary circular line running around the central axis of rotation 34. Each leaf spring unit 65 has a plurality of leaf springs 78, here five by way of example, which are arranged to form a leaf spring assembly. Accordingly, the leaf springs 78 within a leaf spring unit 65 are formed essentially identically and lie flat on one another. Each leaf spring 78 of the leaf spring unit 65, as can be seen particularly well in connection with FIG. 4, is provided with an angle of attack $\alpha$. The angle of attack $\alpha$ is selected so that in the closed position of the second clutch 6, a torque transmitted by the clutch 6 in a driving direction of rotation (pull) increases the axial force/actuating force of the second clutch 6 in a self-reinforcing manner. Accordingly, the force $F_z$ is also applied in order to increase the existing axial actuating force F. In the case of a direction of rotation (thrust) opposite to this drive direction of rotation, however, the axial force is reduced by a corresponding amount. As can also be seen in connection with FIG. 5, the gain factor increases in principle with an increasing angle of attack $\alpha$ of the respective leaf spring 78. It becomes clear here that the angle of attack $\alpha$ may be selected between 6° and 10°, e.g., between 6.5° and 9.5°. This represents a suitable compromise between an increase in the axial force and a stability of the leaf springs 78.

In FIG. 3, two of the leaf spring units 65 can be seen in section, a first leaf spring unit 65 on the side of its first end fixed to the first carrier part 75 (via a rivet 82) and a second leaf spring unit 65 on the side of its, on the second carrier part 76 (via a rivet 82) fixed second end can be seen.

The second carrier 16*b* also has a second sleeve region 77, on the radial inside of which the plurality of second friction plates 51*b* are received in a rotationally fixed manner and are axially displaceable relative to one another.

In other words, according to the disclosure an automatic transmission 30 is provided with a P3 electric machine 19 arranged at the transmission output 2, which can be connected and disconnected by means of a separating clutch 5 and optionally an all-wheel clutch 6 (so-called Quattro clutch) for connecting and disconnecting the Cardan shaft 22, which leads to the distribution gear 32. The system is a hybridization of the transmission 3, which can implement the classic hybrid functions (electric driving, braking and thrust energy recovery, sailing, boost) including an electric machine 19 with a separating clutch 5 and an all-wheel drive clutch 6, which can shift the Cardan shaft 22, if required. The system is arranged in a modular way so that the hybridization can be installed in both front-wheel drive and all-wheel drive (with or without Quattro unit), i.e. the all-wheel drive clutch can also be omitted in front-wheel drive applications.

For reasons of installation space, the electric machine 19 can be connected axially parallel to the drive train 31 and the separating clutch 5 via a gear stage 20. The separating clutch 5 is located in the power flow after the gear stage 20 and before the drive train 31. As a result, the gear losses and bearing drag torque losses are avoided when the separating clutch 5 is open. An integrated passive cooling mechanism 66 including bulkhead element 68, 70 prevents the clutches 5, 6 from splashing in the oil sump and realizes the clutch cooling. Both clutches 5, 6 are actuated by a mechanical actuator 55*a*, 55*b*, which are mounted on a central housing wall 18. The separating clutch 5 is thus operated from the rear and the Quattro clutch 6 from the front. This enables modularization in a simple manner.

According to the embodiment shown, lever-operated clutches 5, 6 are used. It should be noted that the engagement forces are directed into the shaft via the inner plate carrier (first carrier 15*a*, 16*a*) and are supported on the support bearing 17 in the housing wall 18. As a result, in the case of the separating clutch 5 of the electric motor 18, no clutch forces, apart from the sliding friction of the plates, are transmitted to the gear stage 20. Smaller bearings can then be used to mount the gear stage 20.

This clutch design, which is used both in the separating clutch and in the all-wheel clutch 5, 6, allows the following actuator and clutch units to be pre-assembled:

P3 and front-wheel drive: Transmission housing 79 can be closed on the support bearing 17. The input shaft 4 is implemented here in a shortened form.

P3 and all-wheel drive: The module output shaft 10 to the Cardan joint in the bell 46 and in the output shaft of the P3 module (input shah 4) can simply be stored in the all-wheel drive bell (secondary housing component 46).

All-wheel drive without P3 module: In this case, the support bearing wall 18 is connected directly to the transmission housing 79.

REFERENCE NUMERALS

1 Clutch device
2 Output
3 Transmission
4 Input shaft
5 First clutch
6 Second clutch
7a First clutch component of the first clutch
7b First clutch component of the second clutch
8a Second clutch component of the first clutch
8b Second clutch component of the second clutch
9 Gear
10 Output shaft
11a First actuating unit
11b Second actuating unit
12a First lever actuator
12b Second lever actuator
13a First actuating bearing
13b Second actuating bearing
14a First actuating force introduction mechanism
14b Second actuating force introduction mechanism
15a First carrier of the first clutch
15b Second carrier of the first clutch
16a First carrier of the second clutch
16b Second carrier of the second clutch
17 Support bearing
18 Housing wall
19 Electric machine
20 Gear stage
21 Rotor
22 Cardan shaft
23 Electric motor
24 Lever mechanism
75 Rotor axis
26 Bearing flange
27 Housing
28a First housing area
28b Second housing area
29 First module
30 Transmission unit
31 Drive train
32 Differential gear
33 Internal combustion engine
34 Axis of rotation
36 Bearing pedestal
37a First roller bearing
37b Second roller bearing
37c Third roller bearing
37d Fourth roller bearing
38 First receiving area
39 Shim
40 Serration
41 First sleeve area
42 Toothing
43 Rotor shaft
44 Main housing component
45 Retaining ring
46 Secondary housing component
47 Base body
48 Support element
49 Bearing area
50a First friction plate of the first clutch
50b Second friction plate of the first clutch
51a First friction plate of the second clutch
51b Second friction plate of the second clutch
52 Control system
53 Second module
54 Drive train unit
55 Through hole
56 Fastener
60 Lever element
61 Pivot bearing
62 Actuating member
63 Pressing plate
64 Counter support area
65 Leaf spring unit
66 Coolant delivery device
67a First coolant circuit
67b Second coolant circuit
68 First bulkhead element
69a First subspace of the first housing area
69b Second subspace of the first housing area
70 Second bulkhead element
71a First subspace of the second housing area
71b Second subspace of the second housing area
72a First subsystem
72b Second subsystem
73 Jet pump
74 Valve element
75 First carrier part
76 Second carrier part
77 Second sleeve area
78 Leaf spring
79 Transmission housing
80 Stud bolts
81 Bearing section
82 Rivet
83 Second receiving area
84 Opening
85 Third module
86a First discharge element
86b Second discharge element

The invention claimed is:

1. A clutch device for a motor vehicle drive train, comprising:
   an electric machine comprising a rotor;
   an input shaft for attaching to an output of a transmission in a rotationally fixed manner;
   a first clutch arranged on the input shaft as a separating clutch between the input shaft and the electric machine, comprising:
   a first clutch component:
   directly connected to the input shaft in a rotationally fixed manner;
   axially supported on the input shaft; and comprising a carrier; and
a second clutch component configured for coupling to the rotor in a rotationally fixed manner via a gear stage or an endless traction drive;
a housing wall;
a support bearing on the housing wall;
an actuating force introduction mechanism rotationally fixed to the first clutch component such that an actuating force which adjusts the first clutch from its open position into its closed position is introduced directly into the input shaft via the carrier and is supported by the input shaft via the support bearing; and
a first actuating unit:
operatively connected to the first clutch; and
comprising a movable actuating bearing arranged to interact with the actuating force introduction mechanism.

2. The clutch device of claim 1 further comprising:
a second clutch; and
a second actuating unit that interacts with the second clutch.

3. The clutch device of claim 2, wherein the second clutch is operated between the input shaft and an output shaft arranged for a rotationally fixed connection to a Cardan shaft.

4. The clutch device of claim 3 further comprising the output shaft, wherein the second clutch comprises a third clutch component is directly connected to the output shaft in a rotationally fixed manner.

5. The clutch device of claim 2, wherein the first actuating unit and the second actuating unit are arranged on sides of the housing wall axially facing away from one another.

6. The clutch device of claim 1 further comprising:
a lever element;
an actuating member; and
a counter support area, wherein the first actuating unit is arranged such that the actuating force is supported via:
the actuating bearing;
the lever element;
the actuating member;
the counter support area;
the carrier;
the input shaft;
the support bearing; and
the housing wall.

7. A transmission unit for a hybrid vehicle comprising:
the clutch device of claim 1; and
the transmission connected to the input shaft.

8. A drive train for a hybrid vehicle comprising:
the transmission unit of claim 7; and
a differential gear, wherein the clutch device comprises an output shaft coupled to the differential gear in a non-rotationally fixed manner.

\* \* \* \* \*